Nov. 18, 1930.  F. B. BELL  1,781,867
CAR WHEEL
Filed Aug. 4, 1928
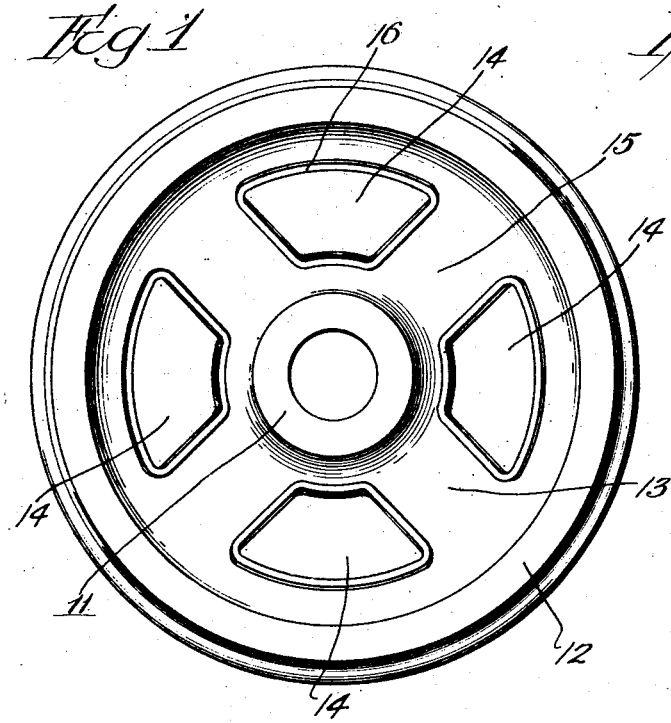
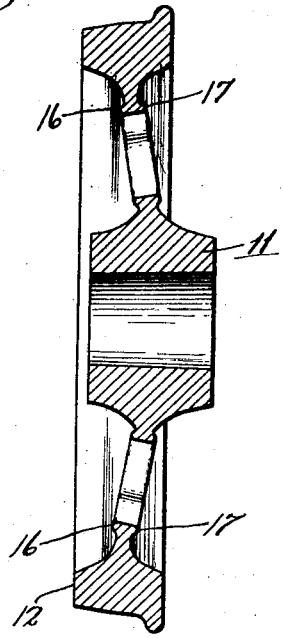
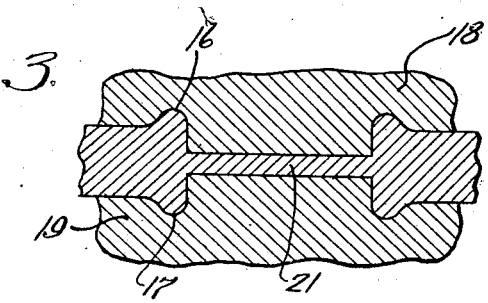
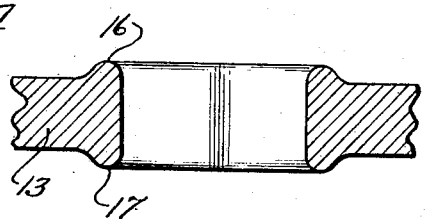
Inventor:
Frank B. Bell
John C. Carpenter
Atty.

Patented Nov. 18, 1930

1,781,867

UNITED STATES PATENT OFFICE

FRANK B. BELL, OF PITTSBURGH, PENNSYLVANIA, ASSIGNOR TO EDGEWATER STEEL COMPANY, OF PITTSBURGH, PENNSYLVANIA, A CORPORATION OF PENNSYLVANIA

CAR WHEEL

Application filed August 4, 1928. Serial No. 297,553.

This invention relates to the manufacture of car wheels, and has for its object broadly the provision of a car wheel of new and improved construction and a process for the manufacture of said car wheel.

A principal object of the invention is the provision of a car wheel of equal strength and lighter in construction than those usually heretofore provided.

My invention contemplates the perforation of the web of the wheel without corresponding weakening of the construction and to this end I provide as an incident to such perforation an outstanding reinforcing rib on one or both sides of the web and about such perforation, such rib being formed by upsetting or drawing the metal either within or without the area of the perforations.

Another important object of the invention is the provision of a car wheel having its central hub and peripheral flanged rim connected by integral spoke parts of strength equal to or greater than the strength of a continuous unperforated web. In such event the material of the web located between the intended spokes is preferably drawn or upset into outstanding reinforcing ribs about the apertures defining the spokes.

Another and highly important object of the invention is the elimination or at least the minimizing of the danger of the cracking of the web of rolled steel car wheels as an incident to their cooling and this without reducing the strength of the resulting wheel. I am aware that it has been proposed to perforate the web of rolled steel car wheels to prevent cracking in cooling but heretofore said perforation has correspondingly weakened the web. In providing reinforcement about such perforation, whatever be its shape, the usual or increased strength is maintained and danger of cracking correspondingly reduced.

Numerous other objects and advantages of the invention will be readily understood from the following description which, when taken in connection with the accompanying drawings, illustrates a preferred embodiment thereof.

Referring to the drawing,

Figure 1 is a front elevation of a car wheel embodying my present invention;

Fig. 2 is a transverse section thereof;

Fig. 3 is a fragmental sectional view illustrating a step in the preferred process of manufacturing the same; and Fig. 4 is a view similar to Fig. 3 and taken after a punching operation to provide the ribs surrounding an opening or confined area.

For the purpose of illustrating my present invention I have shown on the drawing a car wheel comprised generally of the usual hub 11, flanged rim 12 and integral connecting web 13. In order to prevent cracking of the wheel in cooling after rolling and to lighten the wheel, the web 13 is perforated at 14, these perforations in the present instance leaving spoke-shaped integral connecting parts 15 between the hub 11 and rim 12. The material of the web is upset or drawn into ribs or ridges 16 and 17 extending about the perforations and along the sides of the spoke-shaped connection members 15. This material is preferably drawn from the web parts formerly located within the areas of perforation.

The wheel is preferably manufactured by rolling it while properly heated to its final shape and then at the same or a different heat subjecting it to upper and lower dies 18 and 19 formed as shown in Figure 3 to compress the metal within the areas of perforation, drawing or upsetting such metal into the ribs 16 and 17 about such areas. A web 21 is or may be left throughout such area or after such drawing or upsetting operation the web 21 may be punched out as indicated in Fig. 4.

It is thought that the invention and many of its attendant advantages will be understood from the foregoing without further description, and it will be obvious that various changes may be made in the form and location of such perforations and in the process herein described for the manufacture of the wheel without departing from the spirit and scope of the invention or sacrificing all of its material advantages, the form hereinbefore described being merely a preferred embodiment thereof.

I claim:

1. A car wheel, comprising a central hub, a peripheral flanged rim, and a web connecting said hub and rim, said web being provided with outstanding ribs upset from the material of the web to circumscribed isolated web areas.

2. A car wheel, comprising a central hub, a peripheral flanged rim, and a web connecting said hub and rim, areas of said web having continuous circumscribing ribs upset from the metal within the ribs outwardly to form the ribs.

3. A car wheel, comprising a central hub, a peripheral flanged rim and a web connecting said hub and rim, said web being provided with perforations, the material of the web being upset about said perforations to reinforce said web.

4. A car wheel, comprising a central hub, a peripheral flanged rim and a web connecting said hub and rim, said web being provided with perforations, the material of the web being upset about said perforations to reinforce said web upon opposite sides of said web.

5. A car wheel, comprising a central hub, a peripheral flanged rim and a web connecting said hub and rim, said web being provided with perforations, leaving spokes extending radially of said wheel, the material of the web being upset at the edges of said spokes to reinforce said wheel.

6. A car wheel, comprising a central hub, a peripheral flanged rim and a web connecting said hub and rim, said web being provided with perforations to provide spokes extending radially of the wheel, the material of the web being upset about said perforations to provide outwardly extending reinforcing ridges.

FRANK B. BELL.